E. A. RUTENBER.
PHOTOGRAPHIC FILM DEVELOPING MACHINE.
APPLICATION FILED DEC. 14, 1906.
907,890.
Patented Dec. 29, 1908.
2 SHEETS—SHEET 2.
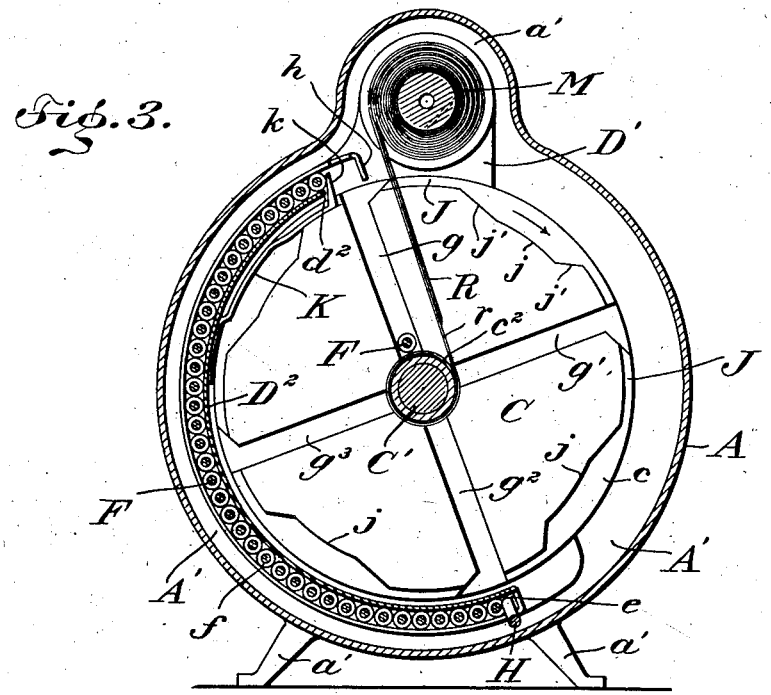
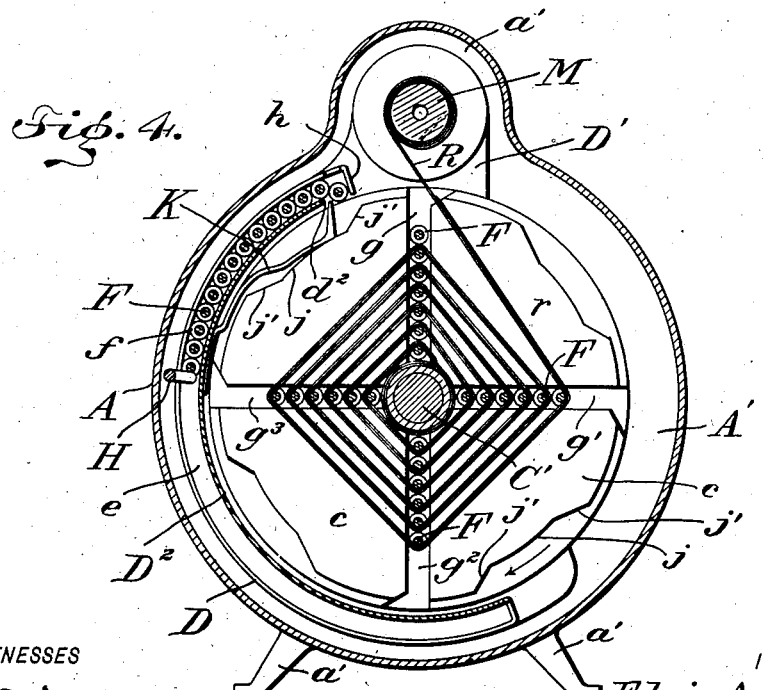
WITNESSES
INVENTOR
Edwin A. Rutenber
BY
ATTORNEYS

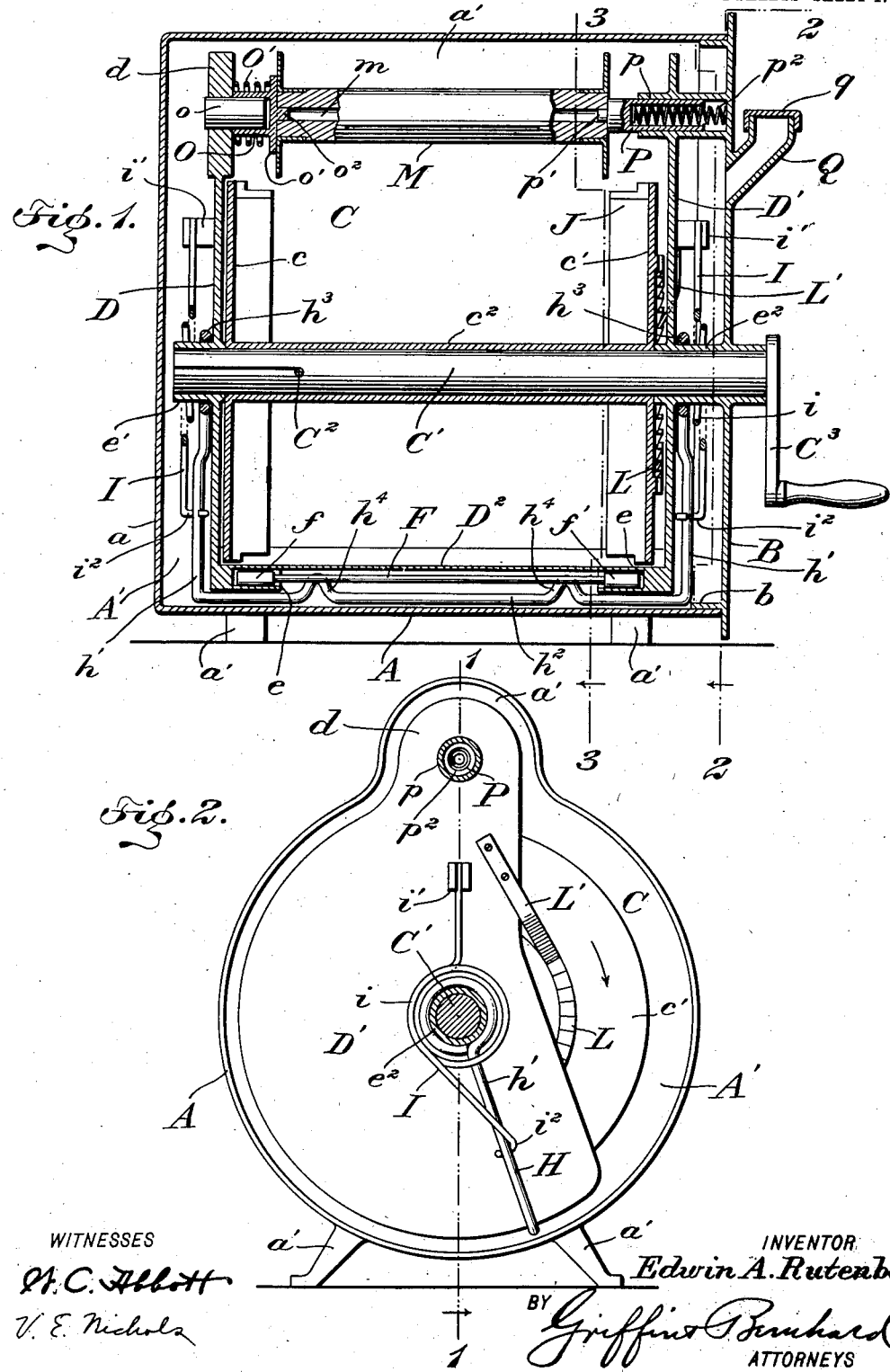

UNITED STATES PATENT OFFICE.

EDWIN A. RUTENBER, OF LOGANSPORT, INDIANA.

PHOTOGRAPHIC-FILM-DEVELOPING MACHINE.

No. 907,890.    Specification of Letters Patent.    Patented Dec. 29, 1908.

Application filed December 14, 1906. Serial No. 347,866.

*To all whom it may concern:*

Be it known that I, EDWIN A. RUTENBER, a citizen of the United States, residing at Logansport, in the county of Cass and State of Indiana, have invented a new and useful Photographic-Film-Developing Machine, of which the following is the specification.

The invention is an apparatus for developing photographic films in the daylight, thereby dispensing with the use of a photographer's dark room.

My apparatus enables the operator to save time and labor in the developing process, for the reason that as soon as the exposures are made, or at any convenient time subsequent thereto, even in bright sunlight, the film may be removed from the camera in the ordinary manner, placed in the machine, the latter then closed, and the operations of developing and fixing the film carried out without risk of the film becoming "light struck" or damaged in any way.

The object of the invention is to provide a simple and compact apparatus which can be easily carried around, in a trunk or other inclosure, and which apparatus can be easily and quickly operated, without exposure of the film to the light, for subjecting the film to the required treatment.

My invention consists, broadly, in the provision of means for spacing the successive portions of a photographic film, during the operation of winding the latter on a movable carrier, such as a reel, whereby the film, when coiled or wrapped on said carrier, will have its layers or convolutions so spaced or separated as to permit of the free circulation of a solution or agent in and through the wrapped film, for the purpose of obtaining access to all portions thereof, and thereby subjecting the film to the proper treatment.

In one embodiment of the invention, the devices for separating and spacing the layers of the film are movable into and from the movable carrier, and, with such spacing devices, coöperate means for feeding them successively to the carrier, when it is moved or turned in one direction.

The aforesaid parts are contained, preferably, in an appropriate casing, the latter being provided, also, with means for supporting a film-spool, from which the film, to be treated, is drawn in the operations of winding it on the carrier, and of spacing the layers by the interposition of the spacing devices.

In the accompanying drawings, I have illustrated one practical embodiment of the invention, but the construction shown therein is to be understood as illustrative only, and not as defining the limits of the invention.

Figure 1 is a vertical longitudinal section through a film developing machine, constructed in accordance with this invention, the plane of section being indicated by the dotted line 1—1, of Fig. 2. Fig. 2 is a vertical cross section through the apparatus, near one end thereof, on the dotted line 2—2, of Fig. 1. Fig. 3 is a vertical cross section on the dotted line 3—3 of Fig. 1, illustrating the magazine loaded with a number of individual spacing members, and showing also the initial stages of the operation of winding and spacing a film or web on the rotatable carrier. Fig. 4 is a vertical cross section similar to Fig. 3, illustrating an advanced stage of the operation of winding and spacing a film or web on the rotatable carrier.

In the embodiment of the invention shown by the accompanying drawings, A designates a shell or casing, which is provided at one end with a head or closure $a$, and it is furthermore provided on its under side with suitable legs or feet $a'$, for the purpose of supporting the machine in a horizontal position on a table or other surface during the operations of winding, developing and fixing a photographic film. As shown, the head or closure, $a$, is integral with the casing A, thus forming a permanent closure at one end of the said casing; the other end of the casing being open.

B designates a removable head or closure, which is provided with the flange $b$, the latter being adapted to fit tightly into the open end of the casing, for the purpose of connecting the closure B to the casing A in a liquid tight manner.

Any suitable means or devices may be employed for securing a liquid-tight joint between the casing and the removable head B, but as these details do not form an essential part of the invention, it is not considered necessary to illustrate a specific embodiment of said means.

The casing A, and the heads $a$, B, thereof, may have any suitable shape in cross section, but, for compactness in construction, I have shown the casing as substantially circular, the upper part of the casing being extended in a way to produce a small chamber $a'$, which connects with the main chamber A'. Said small chamber $a'$, at the upper part of the casing, is adapted to receive the photographic film and its spool, when said film is to be developed, whereas the chamber A' contains the several devices forming a part of my apparatus for the treatment of the film.

According to this invention, it is preferable to employ a rotatable carrier, on which the film is adapted to be coiled or wound in a manner to automatically space or separate the layers or convolutions of the film, such automatic spacing of the layers being performed simultaneously with the rotation of the carrier. The carrier C consists of the heads $c$, $c'$, and a sleeve $c^2$, the latter connecting said heads and being secured rigidly thereto.

For supporting the carrier and the several working parts of the machine within the casing A, I employ a frame which is attached to the head B, so as to be independent of the casing A, the latter being removable from the head B and the other working parts of the machine when it is desired to obtain access to the interior of said machine. The frame forms a magazine for holding the desired number of individual web spacing members, as will hereafter appear. As shown by the drawings, the frame consists of members or plates D, D', said plates being preferably of the form shown by Fig. 2, from which it appears that each plate is provided with an arm or extension $d$, adapted to project upwardly into the chamber $a'$ within the casing. The plates, D, D', are united or connected together by a curved web or shell $D^2$ (see Figs. 1, 3 and 4 of the drawings), curved grooves, $e$, being formed between the web or shell and inwardly projecting flanges of the plates D D' near the periphery thereof. The plate D of the frame is provided with a hub or boss $e'$, whereas the other plate D' has a boss or sleeve $e^2$, the latter being arranged in alinement with the hub $e'$, and being furthermore united or attached to the head B. It will be understood that the plate D' is secured rigidly by the sleeve $e^2$, to the head B, and that the plate D is connected rigidly by the web or shell $D^2$ to the companion plate D', whereby the several parts of the frame are connected rigidly to each other, and in like manner connected to the head B.

The rotatable carrier C is arranged between the plates D D' of the frame, the heads $c\ c'$ of said carrier lying close to the plates D D' (see Fig. 1). The sleeve $c^2$ of said carrier is in alinement with the hub $e'$ and the sleeve $e^2$, and through these parts, $c^2$, $e'$ and $e^2$, passes a horizontal shaft C'. This shaft is supported in the hub $e'$ and the sleeve $e^2$, and said shaft carries or supports the carrier C, the sleeve, $c^2$, of which is connected by a pin $C^2$, or its equivalent, to said shaft C'. One end of the shaft C' is not connected with the head, $a$, of the casing, whereas the other end of the shaft extends through the sleeve $e^2$, thus enabling a suitable crank handle $C^3$, to be attached to the shaft, see Fig. 1, whereby the shaft may be operated by hand without opening the machine for the purpose of rotating the reel C on its axis within the inclosing casing.

The rotatable carrier C is provided with a plurality of radial grooves or slots adapted for the reception of the spacing members, the latter being shown in one embodiment of the invention as rods F, which are provided with heads $f f'$ at the respective ends thereof, see Fig. 1.

As shown by Figs. 3 and 4, each head $c\ c'$ of the rotatable carrier has radial grooves, $g\ g'$ $g^2\ g^3$, although the number of grooves may be increased or decreased as desired. The groove $g$ of the head $c$, is in alinement with the groove $g$ of the head $c'$, and this is true with respect to each of the other grooves in the respective heads, whereby the spacing rods F, when fed or supplied to the carrier, may be connected with the heads $c\ c'$ in a manner to rotate or turn with said carrier. The corresponding grooves, $g$, $g$, in the respective heads of the carrier form a pocket or receptacle adapted to receive a number of the spacing rods, F; and the same is true of each of the other grooves, $g'$, $g^2$, $g^3$, in said heads of the carrier.

It will be understood that the headed rods F are contained within the curved grooves $e$, in the plates D D' of the supporting frame, said rods F extending in series partway around the rotatable carrier C, as shown by Fig. 3, when the machine is ready for operation. These headed rods are adapted to be discharged from the magazine one after the other, or successively, and to be supplied or fed to the successive grooves in the heads of the carrier on the rotation of the latter. My machine is provided with the means adapted to normally impel the headed spacing rods toward a discharge point, and it is provided also with means for regulating the successive discharge of said spacing rods from the magazine to the carrier, these devices being actuated automatically and coöperating with the rotatable carrier for the purpose of controlling the feed of the spacing rods or members.

The point at which the headed spacing rods are delivered from the magazine to the rotatable carrier is at the upper part or side of the machine, preferably at the upper edge or terminal $d^2$ of the web or shell $D^2$. The outer wall of the groove terminates in an inturned extension, $h$, which forms a radial flange, the latter being spaced with relation to the edge $d^2$ of the shell $D^2$, a space or opening being left between said flange $h$ and the edge $d^2$, see Figs. 3 and 4. The headed spacing rods are adapted to be delivered, one after the other, through this space or opening, and each rod F is adapted to rest or lodge on the periphery of the carrier heads $c\ c'$, until said carrier turns far enough for the rod to drop into the proper grooves of the respective heads $c\ c'$.

The headed spacing rods fit loosely in the grooves, $e$, of the plates D D' constituting the magazine, so that the rods are stacked or piled one on top of the other. For lifting the pile of headed rods, and moving them toward the opening which is next to the flange $h$, I provided spring-actuated follower devices, which are independent in their action of the rotatable carrier. In one embodiment of the invention, the lifting or impelling mechanism for the head spacing rods is in the form of a bail H, which is hung loosely on the hub $e'$ and the sleeve $e^2$. Said bail consists of the arms $h'$ and the cross bar $h^2$, said arms $h'$ having loops or eyes $h^3$, fitted loosely around the hub $e'$ and the sleeve $e^2$. The bail H fits loosely around the frame, as shown by Fig. 1, and the cross bar $h^2$ of said bail is provided with the fingers $h^4$, the latter being adapted to engage with the spacing rods F between the heads $f$ thereof, see Fig. 1. Any suitable form of spring may be employed for moving the swinging bail H in one direction, but, as shown by Figs. 1 and 2, I prefer to employ the springs I, arranged at the respective ends of the machine. Each spring is coiled upon itself to produce a loop, $i$, adapted to fit around the hub $e'$ and the sleeve $e^2$, one arm of the spring being confined in a fixed lug $i'$, while the other end of the spring is formed into a hook $i^2$, which engages with an arm $h'$ of the bail. It is evident that the springs I exert tension on the bail H, for the purpose of pressing said bail toward the flange $h$, and thus the stack of spacing rods will be moved or impelled toward said flange.

The grooves, $g$, $g'$, $g^2$ and $g^3$, in the heads, $c$, $c'$, of the rotatable carrier divide each head into a plurality of sectors, and the peripheries of these sectors are cut away so as to produce the depressions or pockets, $j'$. The heads, $c$, $c'$, are provided with short peripheral flanges, J, extending beyond the peripheries of the sectors, and on these extended flanges, J, the heads, $f$, of the rods, F, are adapted to rest when discharged from the magazine. The end portions $j'$ of each pocket are inclined, such inclined portions forming cam surfaces, on which are adapted to ride the yieldable detents K. Two of these detents are provided on the fixed frame within the casing, said detents being near the grooves $e$, comprising the magazine for the headed spacing rods F. Each detent is preferably a spring metal plate of irregular contour, one end of each spring detent being secured rigidly to the shell $D^2$ of the frame. The spring detent is provided at its free end with a lip $k$, which is quite close to the radial flange $h$, and said detent K is adapted to spring normally away from the magazine, so as to rest upon the inwardly extending flange J. The arrangement of the detents K with respect to the flanges J of the rotatable reel is such that the detents are pressed by the ribs toward the magazine for the purpose of moving the lips $k$ into the path of the headed spacing rods, whereby the detents operate to confine the rods in the magazine. As the carrier and its flanges J turn, the detents K drop into one of the pockets $j$, thus withdrawing the lips $k$ of said detents from the path of the stack of headed spacing rods, whereupon said spacing rods are impelled by the spring-actuated bail H to discharge the uppermost spacing rod F through the opening between the flange $h$ and the edge $d^2$ of the shell $D^2$. The spacing rod thus ejected from the magazine rests on the edges of the heads $c\ c'$, but as the carrier continues to turn, one of the cam surfaces $j'$ of the ribs J leaves the detents K, and causes the lips $k$ thereof to fit in between the first and second spacing rods of the series. It is to be understood that the first spacing rod referred to is the rod ejected from the magazine in the manner described, and which rests upon the heads of the rotatable carrier, while the second spacing rod is the uppermost rod of the series confined in the magazine. This action of the detents is controlled entirely by the rotation of the carrier for the purpose of ejecting one headed rod from the magazine and preventing the escape of all other rods from said magazine. Now, as the carrier continues to rotate, the ejected rod rests on the heads $c\ c'$ until said heads turn far enough for the ejected rod to drop into the corresponding grooves, $g$, of the carrier heads, whereby the spacing rods are discharged automatically from the magazine and in like manner supplied to the grooved heads of the rotatable carrier. In the construction shown, this automatic discharge and feed of a headed spacing rod takes place at each quarter turn of the carrier C, and said headed rods are thus fed successively to the different sets of grooves on the rotation of the carrier, whereby the headed rods in the different sets of grooves are adapted to engage with one another, and to be spaced by the heads $f$ thereof within said carrier, the rods rotating with the carrier in the manner graphically portrayed in Fig. 4.

The rotatable carrier is prevented from turning in a backward direction by a suitable check mechanism. Said mechanism consists of a ratchet L, which is integral with or attached to the head $c'$. With the ratchet engages a yieldable pawl L', fastened to a frame plate D', although it will be understood that other forms of check devices may be employed.

M designates a film spool adapted to be supported in the chamber $a'$ of the casing by appropriate forms of spool holders. As shown by Fig. 1, the spool holder O is in the form of a brake adapted to engage frictionally with one end of the spool M, to prevent undue rotation thereof. Said holder O is a sleeve mounted loosely on a pin, $o$, attached to an extension, $d$, of the plate D. The sleeve is provided with a brake disk $o'$, and with an axial stud $o^2$, the latter fitting loosely within an opening, $m$, of the film spool. The sleeve, O, is free to move endwise on the supporting pin $o$, and around said sleeve O is a coiled spring O', the latter tending to force the brake disk $o'$ into frictional engagement with an end portion of the film spool M. The other holder P is a hollow spindle, fitted slidably in a sleeve, $p$, which is integral with an extension, $d$, of the frame plate D'. Said spindle, P, has a stud, $p'$, adapted to fit in the opening $m$ of the spool M, and said spindle or holder P is pressed normally toward the film spool by the spring $p^2$. It is evident that the spindle or holder P may be pressed backwardly into the sleeve $p$, when it is desired to remove or insert the film spool M, and, as the two holders O P are spring-actuated, it is evident that a film spool M can be easily introduced or removed, and, that the two holders, may be readily adjusted to accommodate film spools which vary somewhat in length.

The agents for treating a photographic film may be supplied to the apparatus in any suitable way or by any appropriate means. As shown by Fig. 1, the head B of the casing is provided with a pouring spout, Q, the same being preferably inclined. Said spout opens into or communicates with the main chamber A' of the casing, and, as shown, said spout is adapted to be closed by a cap, $q$, or its equivalent.

The operation of the apparatus may be described as follows: To place a film spool M, with a roll of film which has been exposed, into the machine, the operator proceeds to remove the casing A by drawing it endwise from the head B, thereby exposing the frame, the reel-like carrier, and the film spool holders O P. The spacing members F should not be supplied to the machine during the preliminary adjustment of the film spool, thus permitting the carrier C to be rotated quite freely in one direction by operating the crank $C^3$.

It is well known to those skilled in the art that photographic films are supplied to the users of cameras on spools, said films being protected by a black web of non-actinic paper. After the film shall have been exposed, it is customary to wrap the web of paper around the film, and remove it from the camera, this operation being performed in the daylight. The film so exposed and inclosed is adapted to be transferred from the camera to the apparatus of this invention. The spool holder spindle P may be pressed backwardly into the sleeve $p$, the spool M adjusted between the holder O and the repressed holder P, and the spring $p^2$ now operates the holder P so as to make the two holders O P engage frictionally with the respective ends of the spool M, the studs $o^2$ and $p'$ of the respective holders fitting in the passage $m$ of said spool. The operator now proceeds to draw the web of paper, $r$, from the spool M, and the end portion of this web is coiled around the sleeve $c^2$ of the rotatable carrier C. If desired, suitable means may be employed for attaching said web to said sleeve. The carrier is turned for the purpose of connecting the paper web to the sleeve $c^2$, whereupon the operator should proceed to deposit the spacing members, F, in the magazine, $e$, of the frame, D D', care being first taken to press the follower bail H back to the end of the grooves $e$. It is to be understood that the magazine should be charged or filled with the spacing members F, and the detents K engaged with the uppermost spacing members of the series in the magazine. The casing A should now be replaced by slipping it over the frame, and engaging it with the flange $b$ of the head B, thereby inclosing all of the operating parts and the film spool, the crank $C^3$ being the only part exposed outside of the machine. The operator now proceeds to turn the crank $C^3$ slowly, thereby rotating the carrier C, and continuing the operation of winding the web $r$, on the sleeve $c^2$.

As the carrier makes a quarter turn, the following operations take place: the detents K first drop into the pockets $j$ of the carrier, whereupon the uppermost spacing member F is free to drop out of the magazine and upon the heads $c\ c'$ of the carrier. As the carrier continues to turn, the detents K ride upon one of the cam surfaces $j'$, the effect of which is to lift the detents to their raised position, and thrust the lip $k$ between the first and second spacing members F. The detents are kept in their raised positions by engagement with the flanges J, and the lips, $k$, of said detents engage with the second spacing member to prevent the latter from being ejected from the magazine by the action of the spring-pressed follower H. Now, as the carrier completes its first quarter turn, the spacing member F resting on the heads $c\ c'$ will drop into the grooves $g$ of the carrier heads, whereby said spacing member F, on the continued movement of the carrier, is adapted to engage with the web $r$ or the film R substantially as indicated by Fig. 3. The operation of supplying spacing members F to the slots in the carrier C is repeated each time the carrier completes a quarter turn, and thus, on the first rotation of the carrier, spacing members F are supplied successively and automatically to the grooves $g\ g'\ g^2\ g^3$ of said carrier, thereby supplying the carrier with one group of separate spacing members F, the latter forming a supporting surface for the first layer or convolution of the film R. When the carrier completes a second revolution, a second group of spacing members F is supplied in the manner described to the grooves of the carrier, and the spacing members of this second group are adapted for engagement with the film in a manner to support the second layer of the film and to separate or space the second layer of film from the first layer of film. This separation of the layers is due to the fact that the heads $f$, of the first and second groups of members F engage with each other in a manner to space the rods of the second group from the rods of the first group, as shown by Fig. 4. It will be understood that the carrier may be rotated any desired number of times, for the purpose of supplying a desired number of spacing rods to each groove of the carrier, the number of groups of spacing rods depending somewhat upon the length of the photographic film. When the film shall have been wound upon the spacing rods of the carrier, the said film will have been withdrawn from the spool M, and, as will be understood by reference to Fig. 4, the entire wound film will have its convolutions or layers separated or spaced for the purpose of permitting the film treating agents to circulate freely through said film and between the separated layers thereof. Assuming that the film is completely wound upon the carrier, the operator now supplies the developing agent through the spout Q, and the crank $C^3$ should be turned slowly for the purpose of moving the wound film through the bath of developing agent. When the film shall have been developed, the agent may be poured off through the spout, and, if desired, a washing fluid may be supplied through said spout, after which the carrier should be rotated, so as to wash the developer from the film. The washing agent may then be poured off, and a fixing solution of any suitable character can then be supplied to the machine through the aforesaid spout Q. When the film is fixed, the agent may be poured off, the casing A removed, for the purpose of exposing the film, and the film may then be drawn from the carrier. The spacing rods F may, of course, drop out of the grooves which form the pockets or receptacles of said carrier, and they may be gathered together and washed preliminary to replacing them in the machine when it is desired to again use it for developing and fixing a photographic film.

Having thus fully described the invention, what I claim as new and desire to secure by Letters Patent is:—

1. In a device of the class described, a movable carrier, a plurality of spacing devices independent of each other and normally disconnected from said carrier, and means whereby said spacing devices are successively positioned on said carrier during the movement thereof.

2. In a device of the class described, a movable carrier, spacing devices independent of each other and normally disconnected from the carrier, and feed mechanism for supplying the spacing devices to said carrier for said spacing devices to be disposed in radial groups thereon, whereby said groups of devices provide supports for retaining the folds of a web or film in spaced relation to each other on said carrier.

3. In a device of the class described, a revoluble carrier, a plurality of spacing members, normally separate from said carrier, and means operated by the movement of the carrier for feeding the spacing members successively to the carrier.

4. In a device of the class described, a rotatable carrier, and spacing members adapted on the rotation of the carrier to be positioned therein automatically, said members being rotatable with the carrier, and being grouped thereon for spacing and supporting the layers or convolutions of a web or film.

5. In a device of the class described, a rotatable carrier, spacing members independent of each other and normally disconnected from said carrier, and means operated at intervals during each turn of the carrier for positioning said spacing devices within said carrier.

6. In a device of the class described, a magazine, separate or individual spacing members therein, a carrier, and means whereby the spacing members are successively moved from the magazine to the carrier, said spacing members when connected to the carrier being arranged for supporting and spacing the layers of a web or film.

7. In a device of the class described, a casing, a magazine therein, spacing devices adapted to be held by said magazine, a carrier also within the casing, and means whereby the spacing devices are supplied from the magazine to the carrier, said spacing devices when connected to the carrier being arranged for supporting a web or film in separated layers.

8. In a device of the class described, a movable carrier, means for supporting a web or film to be treated, a magazine, spacing devices adapted to be contained normally in said magazine, and means for feeding the spacing devices from said magazine to said carrier.

9. In a device of the class described, a carrier provided with means for receiving spacing members, and headed spacing members adapted to said means of the carrier, the heads of said members spacing them from each other.

10. In a device of the class described, a carrier provided with a plurality of spacing member pockets, and rods adapted to said pockets, said rods having means for spacing the same relative to each other.

11. In a device of the class described, a carrier provided with radial pockets, and web spacing rods adapted to be received in said pockets, each rod having a spacing device, said pockets of the carrier being adapted to receive a plurality of said rods and each group of rods forming a web supporting surface, whereby the layers or convolutions of the web will be supported and separated by the rods.

12. In a device of the class described, a rotatable carrier provided with a plurality of radial pockets, and spacing members adapted to occupy said pockets, each pocket serving to carry a plurality of spacing members, each group of which constitutes a web supporting surface, whereby the layers or windings of a web are supported and separated by groups of members on said carrier.

13. In a device of the class described, a carrier, a magazine having a point of discharge adjacent to the carrier, spacing members in said magazine, and means for arresting the discharge of the spacing members from the magazine, said means being releasable automatically for discharging the spacing devices successively.

14. In a device of the class described, a carrier, a magazine having a point of discharge adjacent to the carrier, spacing members in said magazine, and arresting means operated by the rotation of the carrier for discharging the spacing members from said magazine to said carrier.

15. In a device of the class described, a carrier, a magazine having a point of discharge adjacent to the carrier, spacing members in said magazine, means for moving said spacing members toward said point of discharge of the magazine, and an automatic cutoff operating to check the movement of the spacing members and releasable for the discharge of said spacing members from the magazine.

16. In a device of the class described, a carrier having a plurality of peripheral pockets, and a detent normally closed across the magazine by the carrier, said detent being movable into the pocket of the carrier, whereby the detent is withdrawn from the magazine.

17. In a device of the class described, a carrier having a detent-receiving pocket, and a yieldable detent normally coöperating with the magazine and adapted to move into the pocket of the carrier.

18. In a device of the class described, a magazine for web-spacing members, a radially-slotted carrier having peripheral pockets between the slots thereof, and a detent coöperating with the magazine and adapted to move into the peripheral pocket of the carrier.

19. In a device of the class described, a magazine for web-spacing members, a carrier having peripheral pockets, each pocket having a cam surface, and a yieldable detent adapted to move into said pocket, and to ride on the cam surface thereof.

20. In a device of the class described, a magazine, spacing members therein, a follower operating to move the spacing members toward a point of discharge from the magazine, an arresting device in the path of the spacing members, and a carrier for receiving the spacing members.

21. In a device of the class described, a magazine, a rotatable carrier, spacing members in said magazine, a pivoted follower movable on an axis concentric to that of the carrier and operating on the spacing members, and an arresting device coöperating with the magazine.

22. In a device of the class described, a magazine, a rotatable carrier, means for supporting said carrier, spacing devices in said magazine, a follower bail pivoted on the supporting devices for the carrier and operatively arranged relative to the spacing members, and a spring acting on said follower bail.

23. In a device of the class described, a magazine, a rotatable carrier, spacing devices in said magazine, a spring-actuated follower independent of the carrier and acting to eject the spacing devices, and an arresting device in coöperative relation to the spacing devices and controllable by the rotation of the carrier.

24. In a device of the class described, a rotatable carrier, a magazine, spacing members therein, means for checking the rotation of the carrier in one direction, and means whereby the spacing members are supplied to the carrier when rotated in the other direction.

25. In a device of the class described, a casing, a supporting frame removable bodily from said casing, a web-carrier mounted in said frame, and film-supporting means also mounted in said frame, whereby the web-carrier and the film-supporting means are insertible and removable with said frame.

26. In a device of the class described, a casing, a supporting frame removable bodily from said casing, a web-carrier mounted in said frame, film-supporting means also mounted in said frame, and a brake member coöperating with said film-supporting means, whereby the web-carrier, the film-supporting means and the brake member are insertible and removable with said frame relative to said casing.

27. In a device of the class described, a casing, a supporting frame removable bodily from said casing, a web-carrier mounted in said frame, film-spool holders mounted in the frame above said web-carrier, and a brake member also supported on the frame in a position for engagement with a head of a film spool adapted to be fitted between the holders, whereby the web-carrier, the film-spool holders and the brake member are insertible and removable with said frame relative to the casing.

28. In a device of the class described, a casing, a supporting frame removable bodily from said casing, a web-carrier mounted in said frame, stationary supports on said frame, a slidable member fitted to one of the supports and having a brake disk and a spool-engaging stud, another slidable member on the other supports and likewise having a spool-engaging stud, and springs acting on the individual slidable members.

29. In a device of the class described, a frame attached to a casing-head, a casing adapted to inclose said frame and fitted removably to said head, a carrier mounted for rotation within said frame, and means whereby spacing members are supplied automatically to said carrier.

30. In a device of the class described, a casing, a magazine therein for containing web spacing members, a rotatable carrier also within the casing, and automatic means for feeding spacing devices from said magazine to said carrier.

31. In a device of the class described, a magazine for containing web-spacing devices, a rotatable carrier within said casing, means outside the casing for operating said carrier, and automatic devices operated by the rotation of the carrier for supplying said web spacing devices to the carrier.

32. In a device of the class described, a magazine for containing web-spacing devices, a rotatable carrier within said casing, said carrier having a plurality of radial pockets or receptacles, and means for supplying a web spacing device to one pocket or receptacle of the carrier at each partial rotation of said carrier, said supplying means operating to feed the spacing devices successively and individually to the several pockets or receptacles of the carrier.

33. In a device of the class described, a casing, a magazine for containing web spacing devices, means for supporting a film spool in the casing, a rotatable carrier, a plurality of independent web-spacing devices adapted to be contained in said magazine, and means for feeding the spacing devices successively to the carrier on the rotation thereof, whereby each spacing device when fed to the carrier is brought into engagement with the web or film and forms a support and spacing device for a part of the film or web.

In testimony whereof, I have hereunto signed my name in the presence of two subscribing witnesses.

EDWIN A. RUTENBER.

Witnesses:
E. L. RUTENBER,
CARRIE BIRKENRUTH.